United States Patent [19]

Kitsuki et al.

[11] Patent Number: 5,754,234
[45] Date of Patent: May 19, 1998

[54] MOVING PICTURE DECODING SYSTEM

[75] Inventors: Toshiaki Kitsuki; Akira Sawada, both of Tokyo, Japan

[73] Assignee: NEC Corporation, Tokyo, Japan

[21] Appl. No.: 874,575

[22] Filed: Jun. 13, 1997

Related U.S. Application Data

[63] Continuation of Ser. No. 581,199, Dec. 29, 1995, abandoned, which is a continuation of Ser. No. 164,548, Dec. 10, 1993, abandoned.

[30] Foreign Application Priority Data

Dec. 16, 1992 [JP] Japan ................... 4-354484

[51] Int. Cl.$^6$ ........................................ H04N 7/32
[52] U.S. Cl. ............... 348/394; 348/407; 348/416; 348/420; 348/699
[58] Field of Search ........................... 348/384, 390, 348/391, 394, 396, 400–405, 407, 409–412, 413, 415, 416, 420, 699; 382/232, 236, 233, 238, 248–250; H04N 7/137

[56] References Cited

U.S. PATENT DOCUMENTS

| 5,130,786 | 7/1992 | Murata et al. | 348/391 |
| 5,237,424 | 8/1993 | Nishino et al. | 348/396 |
| 5,347,308 | 9/1994 | Wai | 348/394 |

FOREIGN PATENT DOCUMENTS

| 0360026 | 3/1990 | European Pat. Off. |
| 0503956 | 9/1992 | European Pat. Off. |

OTHER PUBLICATIONS

Signal Processing Image Communication, vol. 2, Aug. 1990, pp. 127–144, A. Puri et al. "Video coding with motion–compensated interpolation for CD–ROM applications".

ELEKTRONIK, vol. 41, No. 9, Nov. 1992, pp. 72–75, M. Querol, "MPEG/H261/Videodecoder mit wenigen Chips" (no translation).

*Primary Examiner*—Richard Lee
*Attorney, Agent, or Firm*—Sughrue, Mion, Zinn, Macpeak & Seas, PLLC

[57] ABSTRACT

An adder restores an image data by adding an output of a reverse DCT portion and an output of a predicted value calculating portion to output to a macro-block buffer. Data temporarily stored in the macro-block buffer is written in a predicting dynamic memory per a unit of data of one word consisted of 2×2 blocks of luminance component (Y), 1×2 blocks of Cr component and 1×2 blocks of Cb components, via a memory data bus. A prediction reference block of the preceding frame stored in the predicting dynamic memory is output to a reference block buffer via the memory data bus. A restored image data of the preceding frame in the predicting dynamic memory is output to a line buffer via the memory data bus.

14 Claims, 6 Drawing Sheets

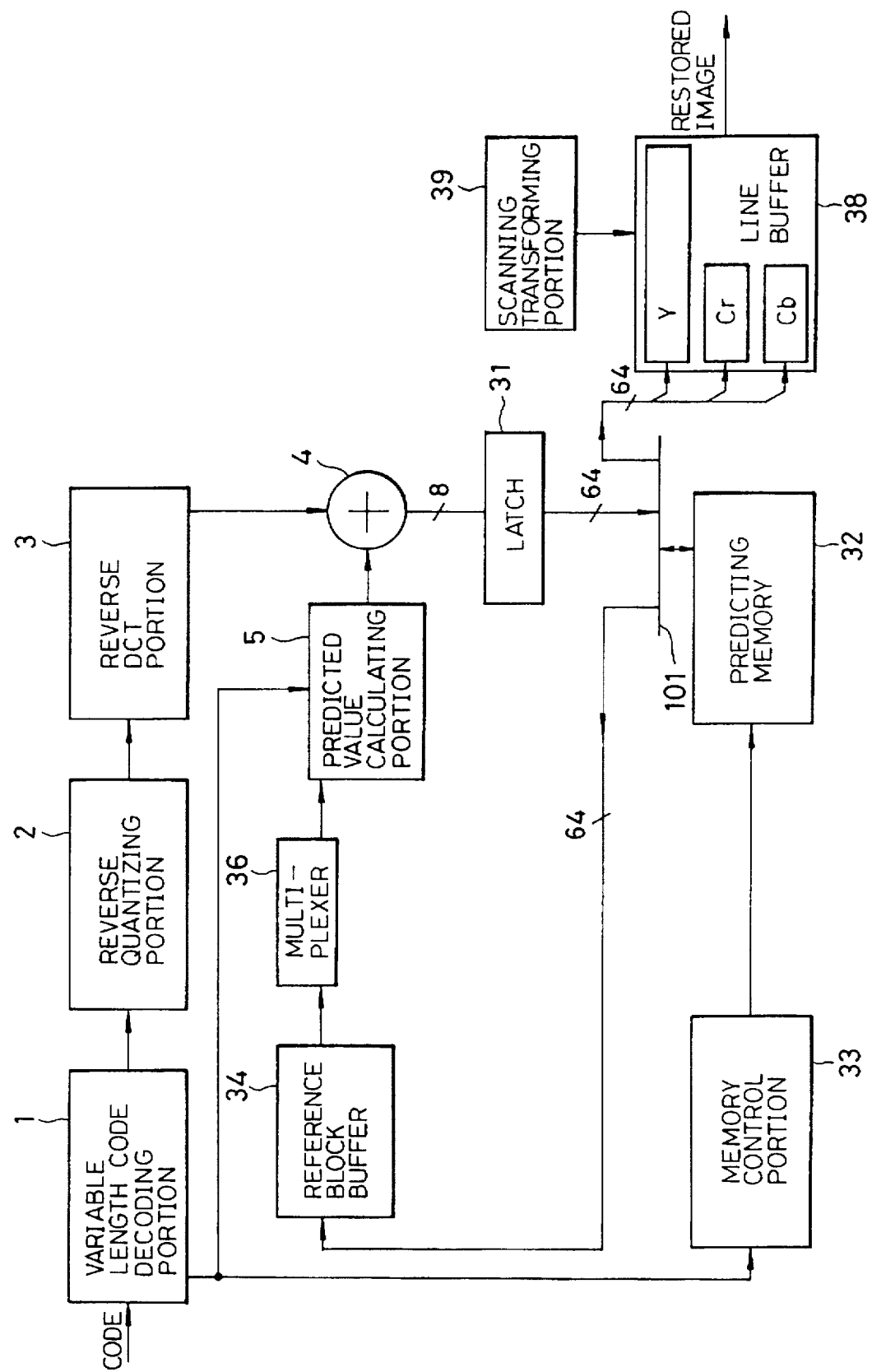

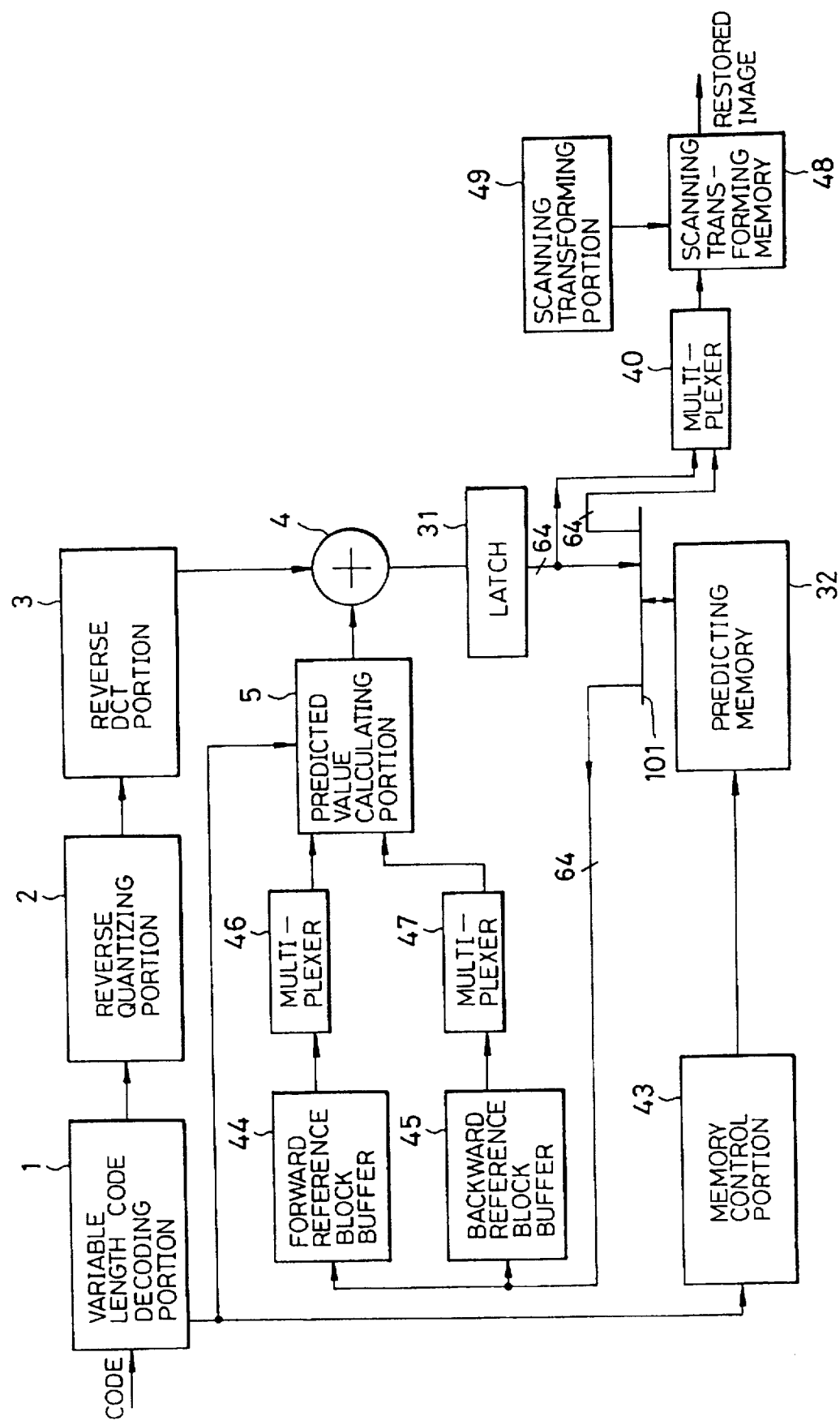

FIG. 6(a) PRIOR ART

| | 0 | | | | | | | 63 |
|---|---|---|---|---|---|---|---|---|
| address 0 | Y | Y | Y | Y | Y | Y | Y | Y |
| address 1 | Y | Y | Y | Y | Y | Y | Y | Y |
| address 2 | Cr | Cr | Cr | Cr | Cr | Cr | Cr | Cr |
| address 3 | Cb | Cb | Cb | Cb | Cb | Cb | Cb | Cb |

FIG. 6(b)

| | 0 | | | | | | | 63 |
|---|---|---|---|---|---|---|---|---|
| address 0 | Y | Y | Y | Y | Cr | Cr | Cb | Cb |
| address 1 | Y | Y | Y | Y | Cr | Cr | Cb | Cb |
| address 2 | Y | Y | Y | Y | Cr | Cr | Cb | Cb |
| address 3 | Y | Y | Y | Y | Cr | Cr | Cb | Cb |

FIG. 7

| | 0 | | | | | 47 |
|---|---|---|---|---|---|---|
| address 0 | Y | Y | Y | Y | Cr | Cb |

MOVING PICTURE DECODING SYSTEM

This is a Continuation of application Ser. No. 08/581,199 filed Dec. 29, 1995, now abandoned, which is a continuation of application Ser. No. 08/164,548 filed Dec. 10, 1993, now abandoned.

BACKGROUND OF THE INVENTION

The present invention relates to a moving picture decoding system. More specifically, the invention relates to a moving picture decoding integrated circuit and a system thereof for decoding a moving picture data coded by an interframe predictive coding method.

The conventional compressive coding method is primarily a coding method adaptively switching an intraframe coding method, a forward predictive coding method, and a bidirectional predictive coding method. On the other hand there is a coding method in which only the intraframe coding method and the forward predictive coding method are switched, and in which the bidirectional predictive coding method is not used.

The intraframe coding method performs coding with only the information from its own frame. The forward predictive coding method performs coding with reference to the information of the former frame. On the other hand, the bidirectional predictive coding method performs coding with reference to the information of the former and backward frames. In order to decode the data coded by the foregoing methods, a predicting frame memory for temporarily storing the former and backward frames is required.

Among decoding methods for decoding data coded through the foregoing methods, there is a system illustrated in FIG. 4, which is a moving picture decoding system not employing the bidirectional predictive coding method, for example.

In this example moving picture decoding system, a code to be decoded is input to a variable length code decoding portion 1. The variable length code decoding portion 1 restores a quantized discrete cosine transformation (DCT) coefficient to output the quantized DCT coefficient to a reverse quantizing portion 2. In conjunction therewith, the variable length code decoding portion 1 restores a prediction mode and a motion vector information to output the prediction mode and the motion vector information to a predicted value calculating portion 5 and a memory control portion 33.

The reverse quantizing portion 2 restores a DCT coefficient from the quantized DCT coefficient to feed the DCT coefficient to a reverse DCT portion 3. The reverse DCT portion restores an interframe difference data or an image data by performing reverse DCT to feed the interframe difference data or the image data to an adder 4.

A predicting memory 32 has a data capacity for two frames for reading and writing and is controlled by an address and a control signal from the memory control portion 33. The memory control portion 33 performs a prediction reference block read control, a restored image data write control, a read control for raster scanning transformation of the restored image data in time sharing manner.

During the prediction reference block read control by the memory control portion 33, with respect to a current position (x, y) of a current frame, a block at a position (x+Δx, y+Δy) corrected with a motion vector of a reference frame is read out. The read out block is output to a reference block buffer 34.

On the other hand, during write control of the restored image data by the memory control portion 33, the data output from the adder 4 is written in the predicting memory 32 (see FIG. 6(a)) when horizontal eight samples are accumulated in a latch 31. Also, during read control of the restored image data by the memory control portion 33, the restored image data of the preceding frame in the predicting memory 32 is read out and transferred to a line buffer 38.

The reference block buffer 34 temporarily stores a predicting reference block input from the predicting memory 32 and outputs to a multiplexer 36 per one word. The multiplexer 36 extracts one 8 bit sample data from the predicting reference block per one word and feeds the sample data to the predicted value calculating portion 5.

The predicted value calculating portion 5 is responsive to input of the one sample data from the multiplexer 36 to calculate a predicted value for a position corresponding to the output of the reverse DCT portion 3 according to a prediction mode and a motion vector information from the variable length code decoding portion 1. The predicted value calculating portion 5 outputs the predicted value to the adder 4.

The adder 4 restores the image data by adding the output of the reverse DCT portion 3 and the output of the predicted value calculating portion 5. The restored image data is output to the latch 31. When data for horizontal eight samples are accumulated in the latch 31, the accumulated data is written in the predicting memory 32 under the control of the memory control portion 33.

A scanning transformation control portion 39 outputs a control signal to a line buffer 38 for controlling writing of the restored image data from the predicting memory 32 and reading out of the restored image in an order of raster scanning.

The line buffer 38 has two banks of buffers for one line for each color component for writing and reading. Namely, when respective one line of respective color components of the restored image data from the predicting memory 32 is written in one of the bank of the line buffer 38, data is read out in the order of raster scanning from the other bank.

It should be noted that the latch 31, the reference block buffer 34, the line buffer 38 are respectively connected to the predicting memory 32 via a memory data bus 101. The memory data bus 101 has a width of 64 bits.

In the moving picture decoding system operating as set forth above, discussion will be given for necessary access speed performance when the memory control portion 33 accesses the predicting memory 32. The access speed performance is most importantly required in the case of the forward direction predictive coding frame. Namely, the access speed performance is required for read control of the predicting reference block, write control of the restored image data and raster scanning transformation of the restored image data by the memory control portion 33.

Here, respective functional block of the moving picture decoding system has blocks of 8 pixels×8 pixels as a minimum unit. Namely, 8 pixels×8 pixels block becomes the minimum unit in reverse quantizing by the reverse quantizing portion 2 and in reverse DCT by the reverse DCT portion 3. Also, in the following discussion, a block constituted of 2×2 blocks of luminance components (Y) and respectively 1×2 blocks of two chrominance components (Cr, Cb) will be referred to as macro-block.

In case that the memory control portion 33 performs write control of the restored image data, the restored data is written in the predicting memory through eight times of access per one block.

On the other hand, when the memory control portion 33 performs read control for the prediction reference block, 8 samples×8 samples of prediction reference block is required if the motion vector makes reference to the integer pixel positions for one block.

If the motion vector makes reference to intermediate pixel positions (half pel), 9 samples×9 samples of prediction reference block is required for one block. However, in case of the word construction taking horizontal 8 samples as one word, 9 samples×9 samples of prediction reference block cannot be directly read out. Therefore, it is required to perform access for horizontal two words (16 samples) for nine times.

Furthermore, when the memory control portion 33 performs read control for raster scanning transformation of the restored image data, data of one horizontal line is output to the line buffer 38 per each chrominance component.

525 line system in the digital television stadio standard CCIR601 is a pixel rate of 720×480 pixel of a frame size and 30 frames/sec of a frame rate. In the above-mentioned standard, a sampling frequency is 13.5 MHz. According to this standard, it is required to output per 858 cycles for one line so that a process at 13728 (858×16) cycles per 16 lines is required.

Next, discussion will be given for the case where the pixel rate of the 525 line system under the CCIR601 standard will be realized by the above-mentioned moving picture decoding system. At first, number of word access per 16 lines of the foregoing moving picture decoding system is concerned;

reading of the prediction reference block: 2 words×9 times×8 blocks×45 macro-blocks=6480 writing of the restored image data 1 word×8 times×8 blocks×45 macro-blocks=2880 reading of restored image data (⅛) word×(720+2×360) samples×16 lines=2880 and thus 12240 times in total of word access becomes necessary. Here, the number of macro-blocks in one horizontal line component is 45 blocks.

On the other hand, an operational clock of LSI is set at integral multiple of a sampling clock of the image. In case of the 525 line system of the CCIR601, since the sampling frequency is 15.5 MHz, one cycle becomes 74 ns.

When a SRAM (static random-access-memory) having an access time less than or equal to 74 ns is employed as the predicting memory 32, one word access of the SRAM can be done in one cycle, the access cycle becomes 12240 cycles which falls with in the necessary access rate of 13728 cycles as required in the 525 line system of the CCIR601 to satisfy the condition. On the other hand, when SRAM having an access time less than or equal to 37 ns is used at 27 MHz, the condition can be satisfied even with the memory data bus 101 of 32 bit width.

Conversely, when DRAMs (dynamic random-access memory) having an access time of 70 ns as the predicting memory 32, necessary access times for accessing the DRAMs become as follow.

Page mode access of the DRAMs become as illustrated in FIG. 3(a), in which, upon initiation of access, after two cycles, i.e. pre-charge cycle of an RAS signal and a CAS signal and row address cycle R, access is performed by inputting column addresses C0, C1, ...

Since two word access in reading of the prediction reference block can be done by sequentially column addressing for two time, number of cycles becomes four. Since column addresses are not in sequence in one word access in writing of the restored image data, one word access in page mode access can be done substantially in one cycle.

Accordingly, when DRAMs are used, necessary number of cycles per 16 lines becomes:

read of prediction reference block: 4 cycles×9 times×8 blocks×45 macro-blocks=12960 write of restored image data 3 cycles×8 times×8 blocks×45 macro-blocks=8640 read of restored image data (⅛) cycles×(720+2×360) sample×16 lines=2880 and thus 24480 cycles in total. Here, number of macro-blocks in one horizontal line is 45.

Accordingly, when DRAMs are employed, the condition of less than or equal to 13728 cycles required for the pixel rate in the 525 line system of the CCIR601, cannot be satisfied. If DRAMs product having approximately 40 ns of access time, it may be possible to perform access for one word in one cycle as in the SRAM having access time less than or equal to 74 ns. However, such DRAM product is currently not available.

In this circumstance, in the moving picture decoding system of the pixel rate higher than or equal to the 525 line system of CCIR601, SRAM is employed, or, in the alternative, DRAM is employed with reduced access times by widening the data bus number to be greater than or equal to 128 bits.

Among the conventional systems for decoding coded data, there is a moving picture decoding system for the moving picture coded signal coded by adaptively switching the intraframe forward predictive coding and bidirectional predictive coding as illustrated in FIG. 5.

The moving picture decoding system of FIG. 5 is differentiated from the system of FIG. 4 in the following points. Namely, in the moving picture decoding system of FIG. 4, only one reference block buffer 34 is provided. In contrast to this, the moving picture decoding system of FIG. 5 employs two reference block buffers, i.e. a former reference block buffer 44 and a backward reference block buffer 45. It should be appreciated that the former prediction reference blocks temporarily stored in the former reference block buffer 44 and a backward prediction reference block temporarily stored in the backward reference block buffer 45 are output to the predicted value calculating portion 5 via a multiplexers 46 and 47.

On the other hand, for a memory control portion 43 of the moving picture decoding system of FIG. 5 is established by adding a control for a bidirectional predictively coded frame for the controls in the memory control portion 33 of FIG. 4. The bidirectional predictively coded frame requires read control for the forward prediction reference block and read control for the backward prediction reference block.

The restored image data output of the bidirectional predictive coding frame performed by writing in a scan transforming memory 48 from the latch 31 via a multiplexer 40 by control of a scan transforming control portion 49 not via the memory data bus 101.

Furthermore, in the moving picture decoding system of FIG. 4, the order of output of data at read control of the restored image data is per respective chrominance components and per one line. In contrast to this, in the moving picture decoding system of FIG. 5, the order of output of data is per macro-block similarly to that of inputting of the restored image data from the latch 31 adapting to the output of restored image data of the bidirectional predictive coding frame. Namely, the restored image data from the latch 31 is written in the scan transforming memory 48 via the multiplexer 40.

For the scan transforming memory 48 of the moving picture decoding system of FIG. 5, two banks of buffers for storing macro-blocks for one horizontal lines must be provided for reading and writing for inputting restored image data per macro-block. Therefore, the memory capacity therefor becomes 360 Kbits.

The scan transforming control portion 49 of the moving picture decoding system of FIG. 5 outputs a control signal to the scan transforming memory 48 for controlling writing of the restored image data input per macro-block, and outputting of the restored image data in an order of raster scanning.

When the pixel rate of the 525 line system of CCIR601 is realized in the above-mentioned moving picture decoding system, the times of word access per 16 lines in the memory control portion 43 becomes 12240 times similar to the word access times of the moving picture decoding system of FIG. 4, in case of forward predictive coding.

In contrast to this, in case of the bidirectional predictive coding, the word access times becomes:

read of forward reference block: 2 words×9 times×8 blocks×45 macro-blocks=6480 read of backward reference block: 2 words×9 times×8 blocks×45 macro-blocks=6480 and thus in total 12960 times. Here, number of macro-blocks in one horizontal line is 45.

When SRAM is employed as the predicting memory 32, the condition of the access rate less than or equal to 13728 cycles necessary for 525 line system of CCIR601 can be satisfied by employing SRAM having access time less than or equal to 74 ns. On the other hand, by employing SRAM having access time less than or equal to 37 ns, the foregoing condition can be satisfied even with the memory data bus 101 of 32 bit width.

Furthermore, when DRAMs are employed as the predicting memory 32, similarly to the moving picture decoding system of FIG. 4, the condition of the access rate less than or equal to 13728 cycles required in 525 line system of CCIR601 cannot be satisfied.

As can be appreciated, in the conventional moving picture decoding system, it has been required to employ SRAM as the predicting frame memory for decoding the moving picture requiring the pixel rate of 525 line system of CCIR601 and inexpensive DRAM cannot be used.

Also, when DRAM is employed with widening the width of the data bus to be greater than or equal to 128 bits, number of terminals of LSI in forming the integrated circuit is increased to prevent downsizing of the LSI.

Furthermore, in order to achieve the 128 bit bus width with employing DRAMs of the currently available maximum width of×16 bits construction, DRAMs must be increased per 8. Therefore, when eight 4-Mbit DRAMs are employed for necessary capacity of [(720+360) samples× 480 lines×8 bits×2 frames=10.546 Mbits] as the predicting frame memory in 525 line system of CCIR601, non-used region of DRAMs become large.

When 1-Mbit DRAMs are used in view of memory capacity efficiency, 16 DRAMs become necessary to make the installation area of the predicting frame memory large.

In case of the moving picture decoding system for the bidirectional predictively coded signal, the output of the restored image data of the bidirectional predictive coded frame is directly written in the scan transforming memory from the latch not via the memory data bus. This is because that large portion of the memory data bus is used for accessing the predicting memory so that cycles (8 cycles×8 times×45 macro-blocks=2880 cycles) per 16 lines necessary for writing in the scan transforming memory cannot be certainly attained.

Therefore, when an external memory is used as the scan transforming memory in integration of the system, 64 extra terminals are required for the data bus of the scan transforming memory to prevent downsizing of the LSI.

SUMMARY OF THE INVENTION

Therefore, it is an object of the present invention to provide a moving picture decoding system which permits employment of inexpensive DRAMs as a predicting memory, and to make the installation area of the predicting memory small to enhance downsizing.

In order to accomplish the above-mentioned and other objects, a moving picture decoding system comprises:

restoring means for restoring an image data on the basis of a discrete cosine transformation coefficient restored from an input code;

predicted value generating means for generating a predicted value at a position corresponding to the image data on the basis of a motion vector restored from the input code and a predicting sample data;

calculation means for restoring the image data including a luminance component and a chrominance component by calculating the output of the restoring means and the predicted value of the predicted value generating means;

a memory data bus for transferring the image data with taking the luminance components and the chrominance components of a plurality of pixels as a unit;

storage means for storing the image data per each address via the memory data bus;

holding means for holding the image data read from the storage means via the memory data bus per block consisted of m×n pixels, which m and n are positive integers; and means for outputting the image data held by the holding means to the generating means in time sharing manner.

In the preferred construction, the moving picture decoding system further comprises memory means for temporarily storing the results of calculation of the calculation means for the block unit of image data consisted of luminance components and the chrominance components of a plurality of pixels, per address; and writing means for writing the result of calculation held in the memory means in the storage means via the memory data bus.

Preferably, access for the storage means is performed by a page mode access of a dynamic memory. Also, the moving picture decoding system may further comprise reading means for reading out the image data from the storage means in an order of raster scanning with taking the luminance components and chrominance components of a plurality of pixels as a unit, and video signal restoring means for restoring a video signal in the order of raster scanning from the image data read out by the reading means. The holding means may be provided for forward prediction and for backward prediction, respectively.

In the further preferred construction, the moving picture decoding system further comprises video signal restoring means for restoring the video signal on the basis of the result of calculation by the calculating means, and control means for controlling such a manner that the result of calculation is output to the video signal restoring means via the memory data bus in conjunction with writing of the result of calculation to the storage means.

The calculating means may include second memory means for temporarily storing the output of the restoring means per block and restoring means for restoring the image data consisted of the luminance components and chrominance components of a plurality of pixels by calculating the output of the second memory means and the result of calculation by the calculating means. The moving picture decoding system may further comprise means for temporarily storing the result of calculation by the calculating means and writing means for writing the temporarily stored result of calculation to the storage means via the memory data bus.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention but are for explanation and understanding only.

In the drawings:

FIG. 4 is a block diagram of the conventional construction of the moving picture decoding system; and FIG. 5 is a block diagram of another conventional construction of the moving picture decoding system.

FIG. 6(a) shows examples of horizontal 8 samples stored per each memory address.

FIG. 6(b) shows an access data unit stored as a word according to one embodiment of the invention.

FIG. 7 shows an access data unit stored as a word according to another embodiment of the inv.

DESCRIPTION OF THE PREFERRED EMBODIMENT

Figure 1:
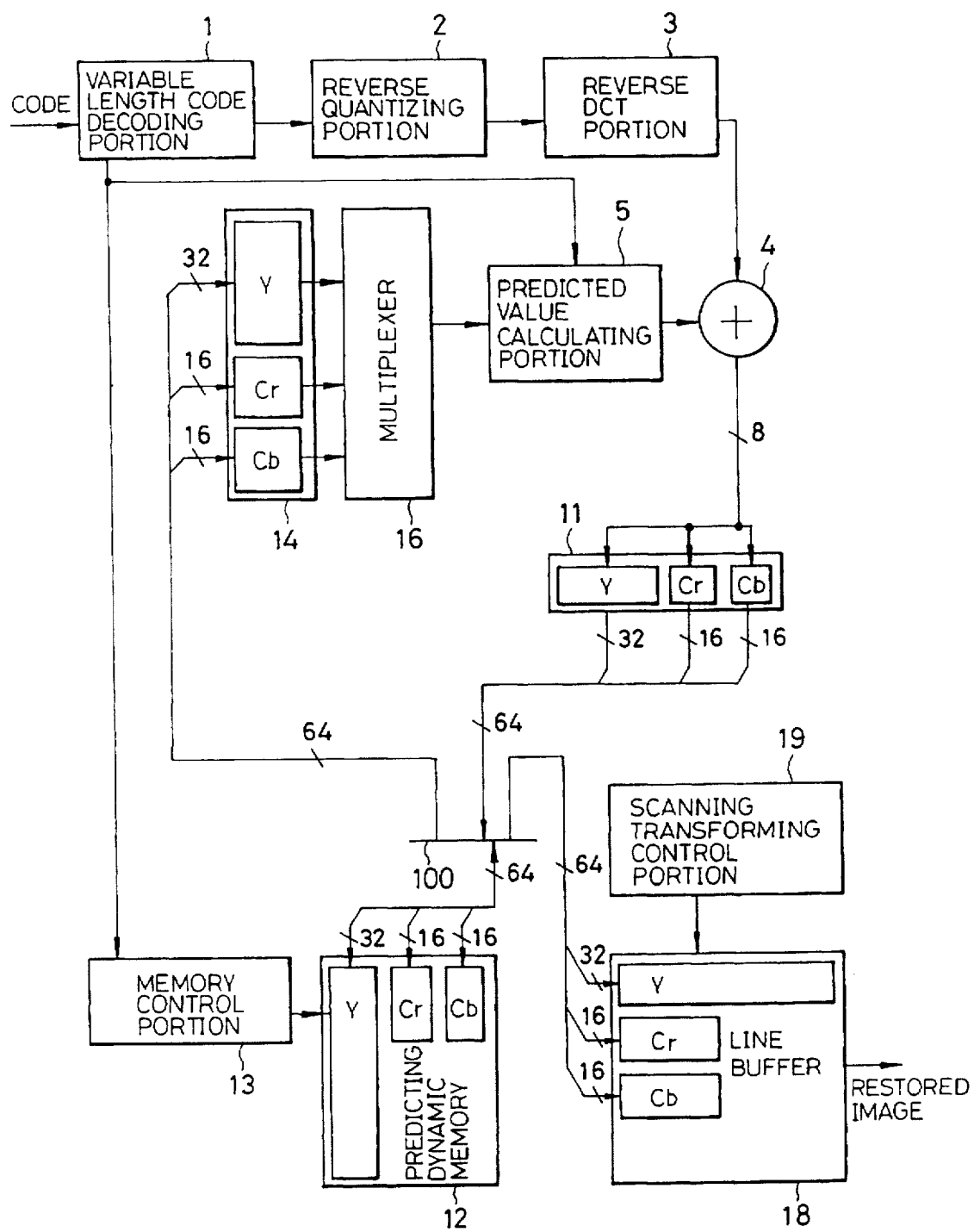
FIG. 1 is a block diagram of one embodiment of a moving picture decoding system according to the present invention.

The present invention will be discussed with reference to the drawings. FIG. 1 shows one embodiment of a moving picture decoding system according to the present invention, which system is adapted for decoding image data coded without using bidirectional predictive coding.

When a code to be decoded is input to a variable length code decoding portion 1, the variable length code decoding portion 1 restores a quantized discrete cosine transformation (DCT) coefficient to output the quantized DCT coefficient to a reverse quantizing portion 2. In conjunction therewith, the variable length code decoding portion 1 restores a prediction mode and a motion vector information to output the prediction mode and the motion vector information to a predicted value calculating portion 5 and a memory control portion 13.

The reverse quantizing portion 2 restores a DCT coefficient from the quantized DCT coefficient to feed the DCT coefficient to a reverse DCT portion 3. The reverse DCT portion 3 restores an interframe difference data or an image data by performing reverse DCT to feed the interframe difference data or the image data to an adder 4.

A predicting dynamic memory 12 has a data capacity for two frames for reading and writing and is controlled by an address and a control signal from the memory control portion 13. The memory control portion 13 performs a prediction reference block read control, a restored image data write control, a read control for raster scanning transformation of the restored image data in time sharing manner.

During the prediction reference block read control by the memory control portion 13, a prediction reference block for a preceding frame stored in the predicting dynamic memory 12 is read out according to a prediction mode and a motion vector. The read out prediction reference block is output to a reference block buffer 14.

On the other hand, during write control of the restored image data by the memory control portion 13, data for one macro-block is written in the predicting dynamic memory 12 when data for one macro-block is accumulated in a macroblock buffer 11. Also, during read control of the restored image data by the memory control portion 13, the restored image data of the preceding frame in the predicting dynamic memory 12 is read out and output to a line buffer 18.

The reference block buffer 14 temporarily stores the prediction reference block input from the predicting dynamic memory 12 and outputs the prediction reference block to a multiplexer 16 per one word. The multiplexer 16 extracts one sample data of 8 bits from the prediction reference block of the one word unit input from the reference block buffer 14 to output the sample data to the predicted value calculating portion 5.

The predicted value calculating portion 5 is responsive to one sample data input from the multiplexer 16, to calculate a predicted value at a position corresponding to the output of the reverse DCT portion 3 to output the predicted value to the adder 4.

The adder adds the output of the reverse DCT portion 3 and the output of the predicted value calculating portion 5 to restore the image data. The restored image data is output to the macro-block buffer 11. When data for one macro-block is accumulated in the macro-block buffer 11, the data is written in the predicting dynamic memory 12 under the control by the memory control portion 13.

In this case, one word (see FIG. 6(b)) of the restored image data consisted of 2×2 samples of luminance component (Y), 1×2 samples of Cr component and 1×2 samples of Cb component, is written per each address. On the other hand, a memory data bus 100 connecting the macro-block buffer 11 and the predicting dynamic memory 12 performs transfer per one word image data consisted of 2×2 samples of luminance component (Y), 1×2 samples of Cr component and 1×2 samples of Cb component.

Accordingly, writing of the restored image data from the macro-block buffer 11 to the predicting dynamic memory 12 is performed per one word of the restored image data consisted of 2×2 samples of luminance component (Y), 1×2 samples of Cr component and 1×2 samples of Cb component. By this, for each address of the predicting dynamic memory, one word of the restored image data is written respectively.

The line buffer 18 has two banks of buffers for two lines for respective chrominance components for reading and writing in order to input one word of the restored image data consisted of 2×2 samples of luminance component (Y), 1×2 samples of Cr component and 1×2 samples of Cb component from the predicting dynamic memory 12 via the memory data bus 100.

Namely, when respective two lines of chrominance components of the restored image data from the predicting dynamic memory 12 is written in one of the banks of the line buffer 18, data is read out in the order to raster scanning from the other bank. Accordingly, the memory capacity of the line buffer 18 is required to be 8 samples×(2×2+1×2+1×2) blocks×45 macro-blocks×2 banks=45 Kbits.

A scanning transformation control portion 19 outputs a control signal to the line buffer 18 to control writing of the restored image data from the predicting dynamic memory 12 and reading of the restored data in the order of raster scanning.

It should be appreciated that the macro-block buffer 11, the reference block buffer 14 and the line buffer 18 are respectively connected to the predicting dynamic memory 12 via the memory data bus 100. The memory data bus 100 has a width of 64 bits to transfer the image data consisted of 2×2 samples of luminance component (Y), 1×2 samples of Cr component and 1×2 samples of Cb component.

Next, discussion will be given for access of the predicting dynamic memory by the memory control portion 13. As access of the predicting dynamic memory 12 by the memory control portion 13, there are read control of the prediction reference block, write control for the restored image data, read control for raster scanning transformation of the restored image data.

When the memory control portion 13 performs write control of the restored image data, the restored image data is written in the predicting dynamic memory 12 by word access for 8 words×8 times per macro-block.

On the other hand, when read control of the prediction reference block is to be performed by the memory control portion 13, the prediction reference block for one macro-block is required 16×16 samples of luminance component (Y) and 8×16 samples of the chrominance components if the motion vector makes reference to integer pixel positions. However, when the motion vector makes reference to the intermediate pixel positions (half pel), the prediction reference block is required 17×17 samples of the luminance components (Y) and 9×17 samples of the chrominance component.

Accordingly, in case of the word construction of the shown embodiment, in which one word is consisted of 2×2 samples of luminance component (Y), 1×2 samples of Cr component and 1×2 samples of Cb component, reading of the prediction reference block from the predicting dynamic memory 12 is performed by access of the 9×9 words.

Furthermore, when read control for raster scanning transformation of the restored image data by the memory control portion 13, output to the line buffer 18 is performed per word in the horizontal direction instead of outputting per macro-block.

Hereinafter, discussion will be given for the case where the pixel rate of 525 line system of CCIR601 by the shown embodiment. At first, considering word access times per 16 lines in the shown embodiment, read of prediction reference block: 9 words×9 times×45 macro-blocks=3645 write of restored image data: 8 words×8 times×45 macro-block=2880 read of restored image data: 360 words×8 horizontal lines=2880 and thus 9405 times in total are required. Here, one horizontal line is consisted of 45 macro-blocks.

When DRAM (dynamic random-access-memory)is used as the predicting dynamic memory, the number of cycles necessary for accessing DRAMs becomes as follows.

Figure 3A:
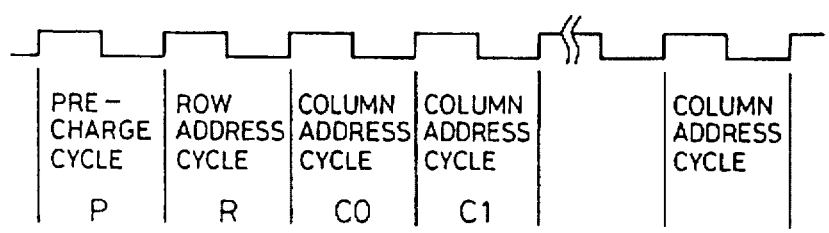
FIG. 3(a) is an illustration showing a page mode access cycle of DRAM.

Page mode access of the DRAMs becomes as illustrated in FIG. 3(a), in which, upon initiation of access, after two cycles, i.e. pre-charge cycle of an RAS signal and a CAS signal and row address cycle R, access is performed by inputting column addresses C0, C1, . . . .

Figure 3B:
FIG. 3(b) is an illustration of a write access cycle of a restored image data.

8 word access during write control of the restored data by the memory control portion 13, will not access a page boundary, and thus performed by 10 cycles as shown in FIG. 3(b).

Figure 3C:
FIG. 3(c) is an illustration showing a read access cycle of a predicting reference block out of a page boundary.
Figure 3D:
FIG. 3(d) is an illustration of a read access cycle of a prediction reference block on the page boundary.

On the other hand, 9 word access in the read control of the prediction reference block by the memory control portion 13 without accessing the page boundary, is performed by 11 cycles as shown in FIG. 3(c). On the other hand, if access is made to the page boundary, the 9 word access in read control of the prediction reference block by the memory control portion 13 is performed by 13 cycles as shown in FIG. 3(d).

Furthermore, in case of access in read control of the restored image data by the memory control portion 13, page boundary will be included only several times so that pre-charge cycle P and row address cycle R can be ignored. Therefore, one word access can be taken place in approximately one cycle.

Accordingly, when DRAMs are used, necessary cycles per 16 lines will be:

read of prediction reference block: 13 cycles×9 times×45 macro-blocks=5265 write of restored image data: 10 cycles×8 times×45 macro-blocks=3600 read of restored image data: 360 cycles×8 horizontal lines=2880 and thus 11745 cycles in total. Here, number of macro-blocks in one horizontal line is 45.

Accordingly, when DRAMs are used, the condition of less than or equal to 13728 cycles per 16 lines necessary for the pixel rate of 525 line system of CCIR601 can be satisfied.

In the above-mentioned one embodiment of the invention, by writing the restored image data on the memory data bus in the line buffer 18 in conjunction with writing of the restored image data from the macro-block buffer 11 to the predicting dynamic block 12, a frame delay which is otherwise caused upon transforming into a video signal, can be resolved. It should be appreciated that, in this case, as a capacity of the line buffer 18, a larger capacity then 2 lines×2 banks becomes necessary.

Figure 2:
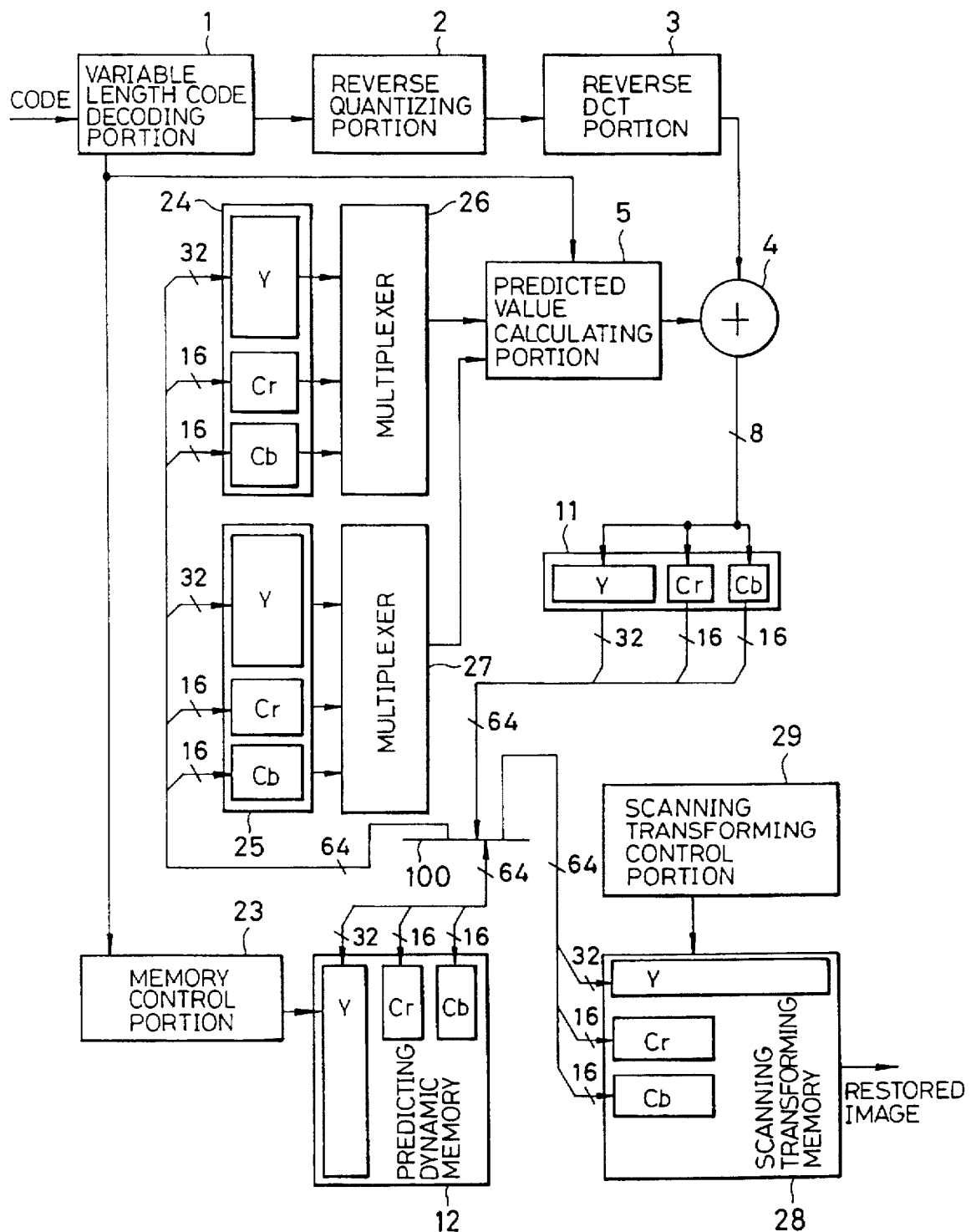
FIG. 2 is a block diagram of another embodiment of a moving picture decoding system according to the present invention.

FIG. 2 is a block diagram showing another embodiment of the moving picture decoding system according to the present invention. In FIG. 2, the shown embodiment of the moving picture decoding system is adapted to coding adaptively switching intraframe coding, forward predictive coding and bidirectional predictive coding.

The shown embodiment of the system is differentiated from the system of FIG. 1 in the following points. Namely, while the former embodiment of the moving picture decoding system employs only one macro buffer 14 for forward prediction, the shown embodiment of the system employs a forward reference macro-block buffer 24 and a backward reference macro-block buffer 25.

It should be noted that the forward prediction reference block and the backward prediction reference block temporarily stored in the forward reference macro-block buffer 24 and the backward prediction reference block 25 respectively are output to the prediction value calculating portion 5 via multiplexers 26 and 27.

Also, a memory control portion 23 of the shown embodiment of the moving picture decoding system is provided a control for a bidirectional predictively coded frame in addition to the control of the memory control portion 13 in the former embodiment. For the bidirectional predictively coded frame requires read control for the forward prediction reference macro-block and read control for the backward prediction reference macro-block.

Output of the restored image data of the bidirectional predictively coded frame is performed by writing the restored image data output from the macro-block buffer 11 under the control of a scan transformation control portion 29 to a scanning transforming memory 28 via the memory data bus 100.

Furthermore, in the former embodiment of the invention, the order of data output during read control of the restored image data is per each chrominance component and per one line. In contrast to this, the shown embodiment, the order of data output is per macro-block similarly to inputting of the restored image data from the macro-block buffer 11 adapting to output of data of the restored image data of the bidirectional predictively coded frame.

The scanning transforming control portion 29 of the shown embodiment outputs the control signal to the scanning transforming memory 28 to control writing in the input restored image data per macro-block and outputting of the restored image data in the order of raster scanning.

In case that the pixel rate of 525 line system of CCIR601 is to be realized by the shown embodiment of the moving picture decoding system of the invention, considering the word access times of the predicting dynamic memory per 16 lines by the memory control portion 23, the word access times becomes 9405 times similarly to the former embodiment in case of the forward predictive coding is concerned.

On the other hand, in case of the bidirectional predictive coding, read of forward prediction reference block: 9 words×9 times×45 macro-blocks=3645 read of backward prediction reference block: 9 words×9 times×45 macro-blocks=3645 and thus in total 7290 times. Here, the number of macro-blocks in one horizontal line is 45.

When DRAMs are used as the predicting dynamic memory as in the former embodiment, necessary cycles per 16 lines will be:

read of prediction reference block: 13 cycles×9 times×45 macro-blocks=5265 write of restored image data: 10 cycles×8 times×45 macro-blocks=3600 read of restored image data: 10 cycles×8 times×45 macro-blocks=3600 and thus in total 12465 cycles. Here, the number of macro-blocks in one horizontal line is 45.

On the other hand, in case of the bidirectional predictive coding, in addition of access of the predicting dynamic memory 12, it becomes necessary to include the number of cycles for writing of the output data of the macro-block buffer 11 in the scanning transforming memory 28 since the memory data bus 100 is also used therefor. Accordingly, the necessary number of cycles becomes:

read of forward prediction reference block: 13 cycles×9 times×45 macro-blocks=5265 read of backward prediction reference block: 13 cycles×9 times×45 macro-blocks=5265 output to scanning transforming memory 28: 8 cycles×8 times×45 macro-blocks=2880 and thus 13410 in total. Here, the number of macro-blocks in one horizontal line is 45.

Therefore, with the shown embodiment, the condition of less than or equal to 13728 cycles necessary for the access rate of 525 line system of CCIR601 can be satisfied. Therefore, the shown embodiment of the system can be adapted to 525 line system of CCIR601.

In the foregoing embodiments, discussion has been given for the case the macro-block is consisted of 2×2 blocks of luminance component (Y), 1×2 blocks of Cr component and 1×2 blocks of Cb components according to the sampling ratio of the luminance component and the chrominance components 4:2:2 in 525 line system of CCIR601.

However, it is possible to use DRAM as the predicting frame memory, even when the macro-block is consisted of 2×2 blocks of luminance component (Y), 1×1 blocks of Cr component and 1×1 blocks of Cb components according to the sampling ratio of the luminance component and the chrominance components 4:1:1 (see FIG. 7) by setting the bus width of the predicting dynamic memory 12 to 48 bits and making 2×2 samples of luminance component (Y), 1×1 samples of Cr component and 1×1 samples of Cb components as one word.

Also, in the foregoing embodiments, as a means for forming the image data with taking 2×2 samples of luminance component (Y), 1×2 samples of Cr component and 1×2 samples of Cb components as one word, the macro-block buffer 11 is provided at later stage of the adder 4.

However, the access method for the predicting dynamic memory 12 in the foregoing embodiments may be applicable by providing means for re-ordering data of one word consisted of 2×2 samples of luminance component (Y), 1×2 samples of Cr component and 1×2 blocks of Cb components at former stage of the adder 4 and a latch for accumulating the outputs of the adder 4 for 8 samples at the later stage of the adder 4.

When the above-mentioned system is realized by an integrated circuit, in the first-mentioned embodiment, the portion excluding the predicting dynamic memory 12 may be realized by LSI or a set of several chips. On the other hand, in case of the later-mentioned embodiment, the portion excluding the predicting dynamic memory 12 or excluding the predicting dynamic memory 12 and the scanning transforming memory 28 may be realized by LSI or a set of several chips.

As set forth, when the restored image data which is restored by the adder 4 per block is temporarily stored in the macro-block buffer 11, by re-ordering the data into one word consisted of 2×2 samples of luminance component (Y), 1×2 samples of Cr component and 1×2 blocks of Cb components, and by outputting the data per one word to the predicting dynamic memory 12, reference macro-block buffer 14 or the forward reference macro-block buffer 24 and the backward reference macro-block buffer 25, and the line buffer 13 or the scanning transforming memory 28, the predicting dynamic memory 12 can be accessed by page mode access of DRAM. Therefore, inexpensive DRAMs can be used as the predicting dynamic memory.

On the other hand, by providing 64 bit width for the memory data bus 100, the predicting frame memory can be constituted with four DRAMs when×16 bit construction of 4-Mbit DRAMs are used. Therefore, in comparison with conventional 128 bit bus, installation area can be reduced.

Furthermore, since four 4-Mbit DRAMs are employed for necessary capacity of the predicting frame memory of [(720+360×2) samples×480 lines×8 bits×2 frame=10.546 . . . Mbits] for 525 line system of CCIR601, non-used area will never been increased.

In addition, even when the external memory is used as the scanning transforming memory in integration of the system, it becomes unnecessary to add 64 terminals as terminals for the data bus of the scanning transforming memory and can contribute for down-sizing of the LSI.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A moving picture decoding system comprising:

restoring means for (1) restoring predicting error data on the basis of a discrete cosine transformation coefficient restored from an input code, and (2) restoring a motion vector from said input code;

predicted value generating means for generating a predicted value at a position corresponding to said predicting error data on the basis of said motion vector and predicting sample data;

calculating means for supplying restored image data words by calculating said predicting error data and said predicted value;

a plurality of said restored image data words being operationally grouped to define macro blocks of restored image data;

each of said macro blocks comprising luminance component blocks and chrominance component blocks, said luminance component blocks and said chrominance component blocks each consisting of a group of pixels, m×n in number, where m and n are positive integers;

each of said macro blocks having defined therein access data units of restored image data, each of said access data units of restored image data including luminance component pixels and chrominance component pixels, said luminance component pixels being from said group of pixels of one of said luminance component blocks, said chrominance component pixels being from said group of pixels of one of said chrominance component blocks;

a memory data bus with sufficient capacity to transfer an entire one of said access data units of restored image data in a single step;

storage means for storing one of said access data units of restored image data as a word at an address via said memory data bus, wherein one of said access data units of restored image data comprises only 4 said luminance component pixels from only one of said luminance component blocks, and only 4 of said chrominance component pixels, 2 of said only 4 chrominance component pixels being from only 1 of said chrominance component blocks, and 2 other said only 4 chrominance component pixels being from only another of said chrominance component blocks;

holding means for (1) reading, in a single step and via said memory data bus, and (2) holding one of said access data units of restored image data stored in said storage means; and means for supplying said predicting sample data by outputting one of said access data units of restored image data held by said holding means to said predicted value generating means in a time sharing manner.

2. A moving picture decoding system as set forth in claim 1, which further comprises buffer memory means for temporarily storing said restored image data words received from said calculation means to define said access data units of restored image data, per each address; and transferring means for transferring one of said access data units of restored image data from said buffer memory means to said storage means, in a single step, via said memory data bus.

3. A moving picture decoding system as set forth in claim 1, wherein access for said storage means is performed by a page mode access of a dynamic memory.

4. A moving picture decoding system as set forth in claim 1, which further comprises reading means for reading out said access data units of restored image data from said storage means in an order of raster scanning.

5. A moving picture decoding system as set forth in claim 1, wherein said holding means are provided for forward prediction and for backward prediction.

6. A method of decoding moving picture data, comprising:

a. applying discrete cosine transformation to coded moving picture data to supply predicting error data, a prediction mode, and a motion vector;

b. generating a predicted value at a position corresponding to said predicting error data on the basis of said motion vector and predicting sample data;

c. adding said predicted value and said predicting error data to produce restored image data words;

d. temporarily accumulating a plurality of said restored image data words in a buffer memory to produce a macro block of restored image data, said macro block comprising luminance component blocks and chrominance component blocks, said luminance component blocks and said chrominance component blocks each consisting of a group of pixels, m×n in number, where m and n are positive integers, said macro block having defined therein access data units of restored image data, each of said access data units of restored image data including luminance component pixels and chrominance component pixels, said luminance component pixels being from said group of pixels of one of said luminance component blocks, said chrominance component pixels being from said group of pixels of one of said chrominance component blocks;

e. transferring one of said access data units of restored image data via a memory data bus, in a single step, to a predicting dynamic memory and storing said one of said access data units of restored image data as a word in said predicting dynamic memory, said one of said access data units of restored image data comprising only 4 of said luminance component pixels from only 1 of said luminance component blocks, and only 4 of said chrominance component pixels, 2 of said only 4 chrominance component pixels being from only 1 of said chrominance component blocks, and 2 other of said only 4 chrominance component pixels being from only another 1 of said chrominance component blocks;

f. defining a prediction reference block from said access data units of restored image data, having a plurality of prediction reference words and including said luminance component pixels and said chrominance component pixels;

g. transferring said prediction reference block to a reference block buffer, via said memory data bus, in response to said motion vector;

h. providing said predicting sample data for use in step b, from said reference block buffer by sequentially supplying each of said plurality of prediction reference words; and i. copying one of said access data units of restored image data, in a single step, to a line buffer via said memory data bus;

whereby said line buffer stores said access data units of restored image data for subsequent output to a raster scan device.

7. The method of decoding moving picture data as set forth in claim 6, wherein step g. comprises the following steps:

g.1 transferring said prediction reference block to a backward reference block buffer portion of said reference block buffer, in a single step, via said memory data bus; and g.2 transferring a next prediction reference block to a forward reference block buffer portion of said reference block buffer, in a single step, via said memory data bus.

8. A method of decoding moving picture data, said method comprising the steps of:

a. applying discrete cosine transformation to coded moving picture data to supply predicting error data, a prediction mode, and a motion vector;

b. generating a predicted value at a position corresponding to said predicting error data on the basis of said motion vector and predicting sample data;

c. adding said predicted value and said predicting error data to produce restored image data words;

d. temporarily accumulating a plurality of said restored image data words in a buffer memory to produce a macro block of restored image data, said macro block comprising luminance component blocks and chrominance component blocks, said luminance component blocks and said chrominance component blocks each consisting of a group of pixels, m×n in number where m and n are positive integers, said macro block having defined therein access data units of restored image data, each of said access data units of restored image data including luminance component pixels and chrominance component pixels, said luminance component pixels being from said group of pixels of one of said luminance component blocks, said chrominance component pixels being from said group of pixels of one of said chrominance component blocks;

e. transferring one of said access data units of restored image data via a memory data bus, in a single step, to a predicting dynamic memory and storing said one of said access data units of restored image data as a word in said predicting dynamic memory, said one of said access data units of restored image data comprising only 4 of said luminance component pixels from only 1 of said luminance component blocks, and only 2 of said chrominance component pixels, 1 of said only 2 chrominance component pixels being from only 1 of said chrominance component blocks, and 1 other of said only 2 chrominance component pixels being from only another 1 of said chrominance component blocks;

f. defining a prediction reference block from said access data units of restored image data, having a plurality of prediction reference words and including said luminance component pixels and said chrominance component pixels;

g. transferring said prediction reference block to a reference block buffer, via said memory data bus, in response to said motion vector;

h. providing said predicting sample data for use in step b. from said reference block buffer by sequentially supplying each of said plurality of prediction reference words; and i. copying one of said access data units of restored image data, in a single step, to a line buffer via said memory data bus;

whereby said line buffer stores said access data units of restored image data for subsequent output to a raster scan device.

9. The method of decoding moving picture data as set forth in claim 8, wherein step g. comprises the following steps:

g.1 transferring said prediction reference block to a backward reference block buffer portion of said reference block buffer, in a single step, via said memory data bus; and g.2 transferring a next prediction reference block to a forward reference block buffer portion of said reference block buffer, in a single step, via said memory data bus.

10. A moving picture decoding system comprising:

restoring means for (1) restoring predicting error data on the basis of a discrete cosine transformation coefficient restored from an input code, and (2) restoring a motion vector from said input code;

predicted value generating means for generating a predicted value at a position corresponding to said predicting error data on the basis of said motion vector and predicting sample data;

calculating means for supplying restored image data words by calculating said predicting error data and said predicted value;

a plurality of said restored image data words being operationally grouped to define macro blocks of restored image data;

each of said macro blocks comprising luminance component blocks and chrominance component blocks, said luminance component blocks and said chrominance component blocks each consisting of a group of pixels, m×n in number where m and n are positive integers;

each of said macro blocks having defined therein access data units of restored image data, each of said access data units of restored image data including luminance component pixels and chrominance component pixels, said luminance component pixels being from said group of pixels of one of said luminance component blocks, said chrominance component pixels being from said group of pixels of one of said chrominance component blocks;

a memory data bus with sufficient capacity to transfer an entire one of said access data units of restored image data in a single step;

storage means for storing one of said access data units of restored image data as a word at an address via said memory data bus, wherein one of said access data units of restored image data comprises only 4 of said luminance component pixels from only 1 of said luminance component blocks, and only 2 of said chrominance component pixels, 1 of said only 2 chrominance component pixels being from only 1 of said chrominance component blocks and 1 other of said only 2 chrominance component pixels being from only another 1 of said chrominance component blocks;

holding means for (1) reading, in a single step and via said memory data bus, and (2) holding one of said access data units of restored image data stored in said storage means and means for supplying said predicting sample data by outputting one of said access data units of restored image data held by said holding means to said predicted value generating means in a time sharing manner.

11. A moving picture decoding system as set forth in claim 10, wherein said holding means are provided for forward prediction and for backward prediction.

12. A moving picture decoding system as set forth in claim 10, which further comprises buffer memory means for temporarily storing said restored image data words received from said calculation means to define said access data units of restored image data, per each address; and transferring means for transferring one of said access data units of restored image data from said buffer memory means to said storage means, in a single step, via said memory data bus.

13. A moving picture decoding system as set forth in claim 12, wherein access for said storage means is performed by a page mode access of a dynamic memory.

14. A moving picture decoding system as set forth in claim 13, which further comprises reading means for reading out said access data units of restored image data from said storage means in an order of raster scanning.

* * * * *